US010105589B2

(12) United States Patent
Shi et al.

(10) Patent No.: US 10,105,589 B2
(45) Date of Patent: Oct. 23, 2018

(54) SYSTEM AND METHOD FOR DIRECTING AN OBJECT TO MOVE ON AN INTERACTIVE SURFACE THROUGH A DEFINED PATH

(71) Applicants: Zheng Shi, Beijing (CN); Richard Dickinson, Beijing (CN)

(72) Inventors: Zheng Shi, Beijing (CN); Richard Dickinson, Beijing (CN)

(*) Notice: Subject to any disclaimer, the term of this patent is extended or adjusted under 35 U.S.C. 154(b) by 271 days.

(21) Appl. No.: 15/241,085

(22) Filed: Aug. 19, 2016

(65) Prior Publication Data

US 2016/0354679 A1    Dec. 8, 2016

Related U.S. Application Data

(63) Continuation-in-part of application No. PCT/CN2015/072626, filed on Feb. 10, 2015, which
(Continued)

(51) Int. Cl.
*A63F 3/00* (2006.01)
*G06K 7/10* (2006.01)
(Continued)

(52) U.S. Cl.
CPC ...... *A63F 3/00075* (2013.01); *A63F 3/00643* (2013.01); *G05D 1/0261* (2013.01);
(Continued)

(58) Field of Classification Search
CPC ................... G05D 2201/0214; G06K 19/077
See application file for complete search history.

(56) References Cited

U.S. PATENT DOCUMENTS

2006/0238155 A1* 10/2006 Yourlo ............... B41J 3/28
318/568.11
2008/0300044 A1   12/2008 Ohtani
(Continued)

FOREIGN PATENT DOCUMENTS

CN         1867383         11/2006
CN       101637655          2/2010
(Continued)

OTHER PUBLICATIONS

SIPO: International Search Report for PCT Application No. PCT/CN2014/093763 filed Dec. 12, 2014, dated Mar. 13, 2015.
(Continued)

*Primary Examiner* — Robert T Clarke, Jr.

(57) ABSTRACT

The present invention discloses a system and accompanying method for directing the movement of an object on an interactive surface through a defined path. The system includes an object embedded with a unique identification code (UID), a movement module, and a distinct pattern of capacitive tabs near the surface of the object that makes contact with the interactive surface, an interactive surface configured to recognize the UID, location and orientation information of an object placed on the interactive surface, and a processor operatively linked to the interactive surface and configured to direct, track and correct the movement of the object along a defined path on the interactive surface by tracking the UID, location and orientation of the object continuously and throughout the movement. A centralized control mode is applied in the present invention, which makes the structure of the electronic hardware within the moving object substantially simplified, which leads to a decreased manufacturing cost, and, from an aesthetic point of view, the logic clearer and easily understood.

16 Claims, 5 Drawing Sheets

Related U.S. Application Data is a continuation-in-part of application No. PCT/CN2014/086745, filed on Sep. 17, 2014, which is a continuation-in-part of application No. PCT/CN2014/085668, filed on Sep. 1, 2014, which is a continuation-in-part of application No. PCT/CN2014/084498, filed on Aug. 15, 2014, which is a continuation-in-part of application No. PCT/CN2014/090890, filed on Nov. 12, 2014, which is a continuation-in-part of application No. PCT/CN2014/080495, filed on Jun. 23, 2014, which is a continuation-in-part of application No. PCT/CN2014/079892, filed on Jun. 13, 2014, which is a continuation-in-part of application No. PCT/CN2014/072961, filed on Mar. 6, 2014, which is a continuation-in-part of application No. PCT/CN2014/093763, filed on Dec. 12, 2014.

(51) Int. Cl.
  *G05D 1/02* (2006.01)
  *G06K 19/077* (2006.01)

(52) U.S. Cl.
  CPC ..... *G06K 7/10099* (2013.01); *G06K 7/10356* (2013.01); *A63F 2003/00078* (2013.01); *A63F 2003/00662* (2013.01); *G05D 2201/0214* (2013.01); *G06K 19/07788* (2013.01)

(56) References Cited

U.S. PATENT DOCUMENTS

2011/0272884 A1* 11/2011 Kraegeloh ............... A63F 3/00
    273/237

2012/0049453 A1* 3/2012 Morichau-Beauchant .................
    A63F 3/00214
    273/236

FOREIGN PATENT DOCUMENTS

| | | |
|---|---|---|
| CN | 102039045 | 5/2011 |
| CN | 102281929 | 12/2011 |
| CN | 202933472 | 5/2013 |
| CN | 202983151 | 6/2013 |
| CN | 202983152 | 6/2013 |
| CN | 203264242 | 11/2013 |
| WO | WO2006082547 A2 | 8/2006 |

OTHER PUBLICATIONS

SIPO: International Search Report for PCT Application No. PCT/CN2014/079892 filed Jun. 13, 2014, dated Oct. 27, 2014.
SIPO: International Search Report for PCT Application No. PCT/CN2014/080495 filed Jun. 23, 2014, dated Sep. 29, 2014.
SIPO: International Search Report for PCT Application No. PCT/CN2014/084498 filed Aug. 15, 2014, dated Nov. 19, 2014.
SIPO: International Search Report for PCT Application No. PCT/CN2014/085668 filed Sep. 1, 2014, dated Dec. 4, 2014.
SIPO: International Search Report for PCT Application No. PCT/CN2014/086745 filed Sep. 17, 2014, dated Dec. 19, 2014.
SIPO: International Search Report for PCT Application No. PCT/CN2014/090890 filed Nov. 12, 2014, dated Feb. 15, 2015.
SIPO: International Search Report for PCT Application No. PCT/CN2015/072626 filed Feb. 10, 2015, dated May 13, 2015.

* cited by examiner

SYSTEM AND METHOD FOR DIRECTING AN OBJECT TO MOVE ON AN INTERACTIVE SURFACE THROUGH A DEFINED PATH

CROSS-REFERENCE TO RELATED APPLICATION

This application is a continuation in part of International Patent Application PCT/CN2015/072626, entitled "A System and Method for Directing an Object to Move on an Interactive Surface through a Defined Path", filed on Feb. 10, 2015, which is a continuation in part of International Patent Application PCT/CN2014/086745, entitled "System and Method for Directing a Small Scale Object to Generate a Sensory Output to a User Powered by RF Energy Harvesting", filed on Sep. 17, 2014, which is a continuation in part of International Patent Application PCT/CN2014/085668, entitled "System and Method for Directing a Targeted Object on an Interactive Surface to Produce a Response", filed on Sep. 1, 2014, which is a continuation in part of International Patent Application PCT/CN2014/084498, entitled "System and Method for Directing a Moving Object on an Interactive Surface", filed on Aug. 15, 2014.

International Patent Application PCT/CN2015/072626 is also a continuation in part of International Patent Application PCT/CN2014/090890, entitled "System and Method for Recognizing Objects with Continuous Capacitance Sensing", filed on Nov. 12, 2014, which is a continuation in part of International Patent Application PCT/CN2014/080495, entitled "System and Method to Recognize an Object's ID, Orientation and Location Relative to an Interactive Surface", filed on Jun. 23, 2014, which is a continuation in part of International Patent Application PCT/CN2014/079892, entitled "System and Method for Identifying an Object's ID and Location Relative to an Interactive Surface", filed on Jun. 13, 2014, which is a continuation in part of International Patent Application PCT/CN2014/072961, entitled "System and Method for Identifying an Object's ID and Location Relative to an Interactive Board", filed on Mar. 6, 2014.

International Patent Application PCT/CN2015/072626 is also a continuation in part of International Patent Application PCT/CN2014/093763, entitled "Apparatus and Method for Eliminating Blind Spot in an RF Antenna Array", filed on Dec. 12, 2014.

The entire disclosures of each of the above applications are incorporated herein by reference.

TECHNICAL FIELD

The present invention relates to a system and accompanying method wherein an object is moved over an interactive surface along a defined path.

BACKGROUND

Systems that allow for game pieces to physically move upon the surface of a game board without the assistance of a player so as to play against an A.I. opponent (or another player who doesn't physically move a game piece) are known. U.S. Pat. No. 4,398,720 A entitled "Robot computer chess game" and U.S. Pat. No. 7,780,513 B2 entitled "Board game system utilizing a robot arm" depict systems and accompanying methods for a player to play an A.I. opponent with chess game pieces being physically moved by the A.I. These prior arts make use of a robot arm electrically connected to the computing device and wherein when the board game program is executed, the computing device controls the robot arm to touch the game surface with the contact end to interactively play the board game with a user. There exist a number of drawbacks in using a robot arm to physically pickup game pieces:

firstly, from a purely aesthetic point of view, having a robot arm affixed on the periphery of the board is an awkward design;

secondly, restrictions on the robot arm only being able to manipulate only one game piece at a time as well as the mechanical components of the robot arm itself means that the opponent's moves will be slow and awkward relative to that of the player.

It is a major disadvantage of the prior art that an A.I. opponent cannot move multiple game pieces simultaneously.

U.S. Pat. No. 8,737,035 B2 entitled "Magnetically movable objects over a display of an electronic device" describes a method for an object to move relative to a restricted surface area. The method includes imparting motion to the magnetically movable object by adjusting a magnetic field applied to the magnetically movable object through the display of the electronic device. Unfortunately a major drawback to such a method is that only a single object can be physically moved along the surface. Furthermore, the orientation of the object cannot be determined. Thus, the applications for such a method are seriously limited.

CN102039045 A discloses an interactive surface embedded with an array of RF antennas capable of locating multiple objects embedded with RFID tags placed upon the surface. US 20110272884 A1 entitled "Transport of an object across a surface" describes a system whereby an object uses transport mechanisms to move along a surface. The combination of both prior art cited above would generate a system whereby multiple objects can move upon an interactive surface according to instructions from a computer system. However, such a system cannot accurately identify the orientation of each object relative to the interactive surface, nor can such a system direct the movement of the object along a defined path which can be sometimes a straight line and other times a bending movement along an arc. Thus, game piece movements that perform smooth turns and follows complex defined path cannot be performed using the prior art.

U.S. Pat. No. 7,245,760 B2 entitled "Robot for making an interface surface" describes a robot that can accurately change its position and orientation along a restricted surface area. U.S. Pat. No. 7,245,760 B2 utilizes a distributed control model and requires each moving object to have the ability to determine its location and movement parameters. The surface has imprinted coded data that identify a plurality of locations that the robot itself can recognize through the use of an image sensor. Although U.S. Pat. No. 7,245,760 B2 resolves some of the deficiencies identified in the abovementioned prior arts, the electronics embedded within each robot are costly and the use of plurality of these robots in order to develop an interactive board game could prove to be uneconomical.

SUMMARY OF THE INVENTION

In order to resolve the drawbacks of the aforementioned prior arts, the present invention describes a system and accompanying method whereby an interactive surface is configured to track and direct an object to physically change its position and orientation accurately and along a defined path relative to the interactive surface.

In accordance with one embodiment of the present invention, the system includes:

an object embedded with a unique identification code (UID), a movement module, and a distinct pattern of capacitive tabs near the surface of the object that makes contact with the interactive surface;

an interactive surface configured to recognize the UID, location and orientation information of an object placed on the interactive surface at any location and in any orientation;

a processor operatively linked to the interactive surface.

The processor is configured to direct, track and correct the movement of the object along a defined path on the interactive surface by tracking the UID, location and orientation of the object continuously and throughout the movement.

The interactive surface further includes, embedded beneath the surface, a first array of high-frequency RF antennas for detecting the UID of an object and a dense array of capacitance sensors for detecting the location and orientation of an object.

The system further includes a second high-frequency RF antenna array that is not connected to a reader or any electrical path, and each antenna of the second RF antenna array covers a blind spot of the first array of RF antennas.

Each object further includes a microcomputer unit (MCU) that controls the movement module.

The processor directs the movement of the object by wireless communication modules that are embedded in the object and the interactive surface.

The wireless communication module can be a 2.4 GHz module, a Bluetooth module, or a WIFI module.

The movement module includes a motor for forward and backward movement, a motor for making turns, and a power source.

The processor formulates a movement instruction, a course correction instruction, and a movement completion notice based on the UID, location and orientation of the object, continuously and throughout the movement of the object.

The system further includes a set of movement rules to define the path of movement of the object, and the set of movement rules is executed by either a local server or a remote server.

The system further includes multiple objects, and the paths of movement of the objects are defined by the set of movement rules.

The method for directing the movement of an object on an interactive surface through a defined path is as follows:

step 1: in the initialization stage, the processor of the interactive surface sends an instruction to the MCU of the object, for the MCU to record the host number and host address of the interactive surface and the device number and device address of the object, creating a master-slave relationship for the moving object to be controlled by the interactive surface;

step 2: once the moving object is placed on the interactive surface, the capacitance sensor array and controller detects the capacitance tabs and sends the capacitive coupling information to the processor; the RF antenna array and reader detects the UID of the RFID tag and sends the UID information to the processor;

step 3: the processor calculates the location and orientation of the moving object based on the capacitive coupling information and the UID information received;

step 4: the destination and the associated movement path are determined by game rules; the processor sends an instruction wirelessly to the MCU through the respective communication modules of the object and the interactive surface; the instruction sent by the processor includes the host number and host address of the interactive surface, the device number and device address of the object, and commands for the motors and controllers within the movement module to execute; the MCU receives the instruction, confirms that the instruction is for the object, and sends the instruction to the movement module; the movement module then starts the movement according to the instruction;

step 5: the movement of the object results in a change of capacitive coupling between the capacitance tab and the capacitance sensor array, and the capacitance sensor array and controller sends the capacitive coupling information to the processor; the RF antenna array and reader 504 once again detects the UID of the RFID tag to confirm the identity of the object with changed location and orientation and then sends the UID information to the processor;

step 6: the processor receives the information, calculates the new location and orientation of the object and determines whether the object has reached the intended destination; if the object has not reached the intended destination, the processor determines whether the object has stayed on the correct path with the correct orientation; if the object has not stayed on the correct path or had the correct orientation, the processor issues a new instruction as outlined in step 4, and the steps 4, 5 and 6 are repeated until the processor determines that the moving object has reached the intended destination through the associated movement path and with the correct orientation.

step 7: the process is over as the object reaches the intended destination.

A centralized control mode is applied in the embodiment of the present invention. With this mode, the interactive surface obtains the UID, location and orientation information of the moving object placed on the surface so as to direct the movement of the object. As a result, the structure of the electronic hardware within the moving object is substantially simplified, which leads to a decreased manufacturing cost, and, from an aesthetic point of view, the logic is clearer and easily understood.

BRIEF DESCRIPTION OF THE DRAWINGS

To better illustrate the technical features of the embodiments of the present invention, various embodiments of the present invention will be briefly described in conjunction with the accompanying drawings. It should be obvious that the drawings are for exemplary embodiments of the present invention, and that a person of ordinary skill in the art may derive additional drawings without deviating from the principles of the present invention.

DETAILED DESCRIPTION OF THE INVENTION

Reference will now be made in detail to various embodiments of the invention. While the invention will be described in conjunction with the embodiments, it will be understood that this is not intended to limit the scope of the invention to these specific embodiments. The invention is intended to cover all alternatives, modifications and equivalents within the spirit and scope of invention, which is defined by the apprehended claims.

Furthermore, in the detailed description of the present invention, specific details are set forth in order to provide a thorough understanding of the present invention. However, it will be obvious to one of ordinary skill in the art that the present invention may be practiced without these specific details. For example, "capacitance sensor" and "capacitive tab" technology are discussed in this present invention as examples technology and for the purpose of simplicity; however, other sensor technologies can also be adapted for the purpose of this present invention and are within the scope of the present invention. In other instances, well known methods, procedures, components, and circuits are not described in details to avoid unnecessarily obscuring a clear understanding of the present invention.

The present invention may be better understood and its numerous objectives and advantages will become apparent to those skilled in the art by reference to the accompanying drawings.

The present invention describes a system whereby an interactive surface for tracking and directing an object to physically change to move along a defined path, including:

an object embedded with a unique identification code (UID), a movement module, and a distinct pattern of capacitive tabs near the surface of the object that makes contact with the interactive surface;

an interactive surface configured to recognize the UID, location and orientation information of an object placed on the interactive surface at any location and in any orientation;

a processor operatively linked to the interactive surface;

the processor is configured to direct, track and correct the movement of the object along a defined path on the interactive surface by tracking the UID, location and orientation of the object continuously and throughout the movement.

Figure 1:
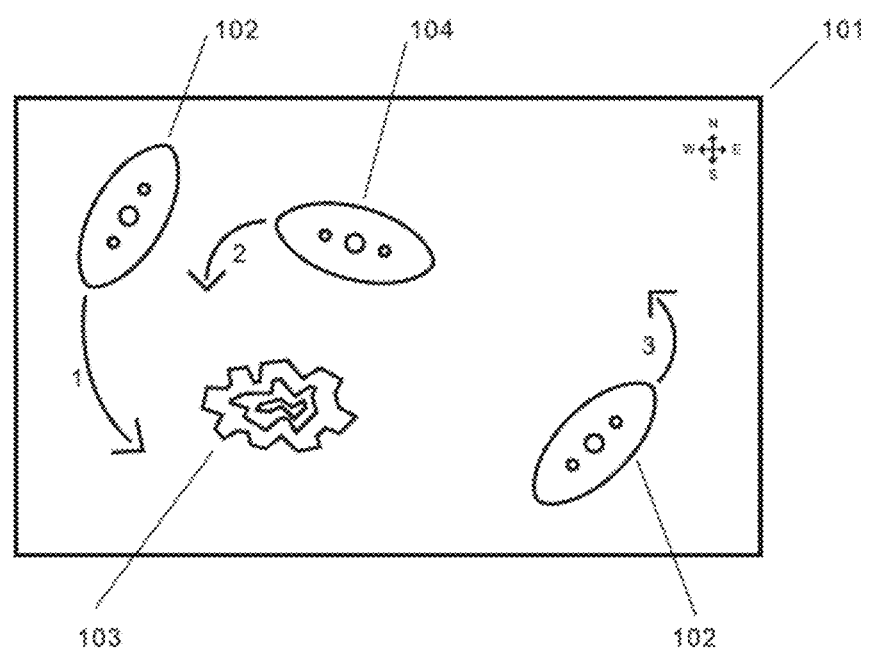
FIG. 1 is an exemplary schematic diagram illustrating a bird's eye view of an interactive surface and a plurality of objects used in an interactive naval warfare board game in accordance with one embodiment of the present invention.

In the embodiment described in FIG. 1, the interactive surface is designed to represent the sea and the objects 102 are designed to resemble miniature naval vessels during the Age of Sail (1650-1815) such as frigates or Man-of-War. Elements 103 such as islands, rocks and coral reefs are also placed on the interactive surface so as to create strategic obstacles during gameplay.

The objective of the game described in FIG. 1 could be to destroy the enemy fleet or scenario based (e.g., safeguard the passage of a trade convoy). The enemy fleet the player faces is remotely controlled by a processor which could be dependent on A.I. or another player that is not physically moving his vessels.

In order to play the naval battle board game described in FIG. 1, a player must, on their turn, physically move one or more of his vessels along the board. This action can be performed manually or through the use of a remote control device. Another alternative design for the movement of the player's vessels would be through the use of voice command recognition technology.

A player's vessels actions will be restrained by various elements of the games. For example, the distance a particular vessel can move will depend on the predetermined speed (which is depicted as distance in turn-based games) and the speed and direction of the wind. The damage and rate of fire of a vessel will also be dependent of criteria such as vessel type, damaged taken, orientation of the vessel vis-a-vis target, etc. The speed by which a vessel turns (i.e., the angle of the turn arc) is also an important criterion. All of these criteria are game design specific and dependent on the electronic program run on the system's processor.

The interactive surface (i.e., the game board) 101 has, embedded beneath the surface, a first array of high-frequency RF antennas for detecting the unique ID of moving objects placed on the surface, for example, a player's vessel 102, and a dense array of capacitance sensors for detecting the location and orientation of the object. Once, a player has completed their turn, the processor is configured, based on either an A.I. instruction or other players command, to direct an enemy vessel 104 to move in response to the action of the player's vessel 102.

Figure 2:
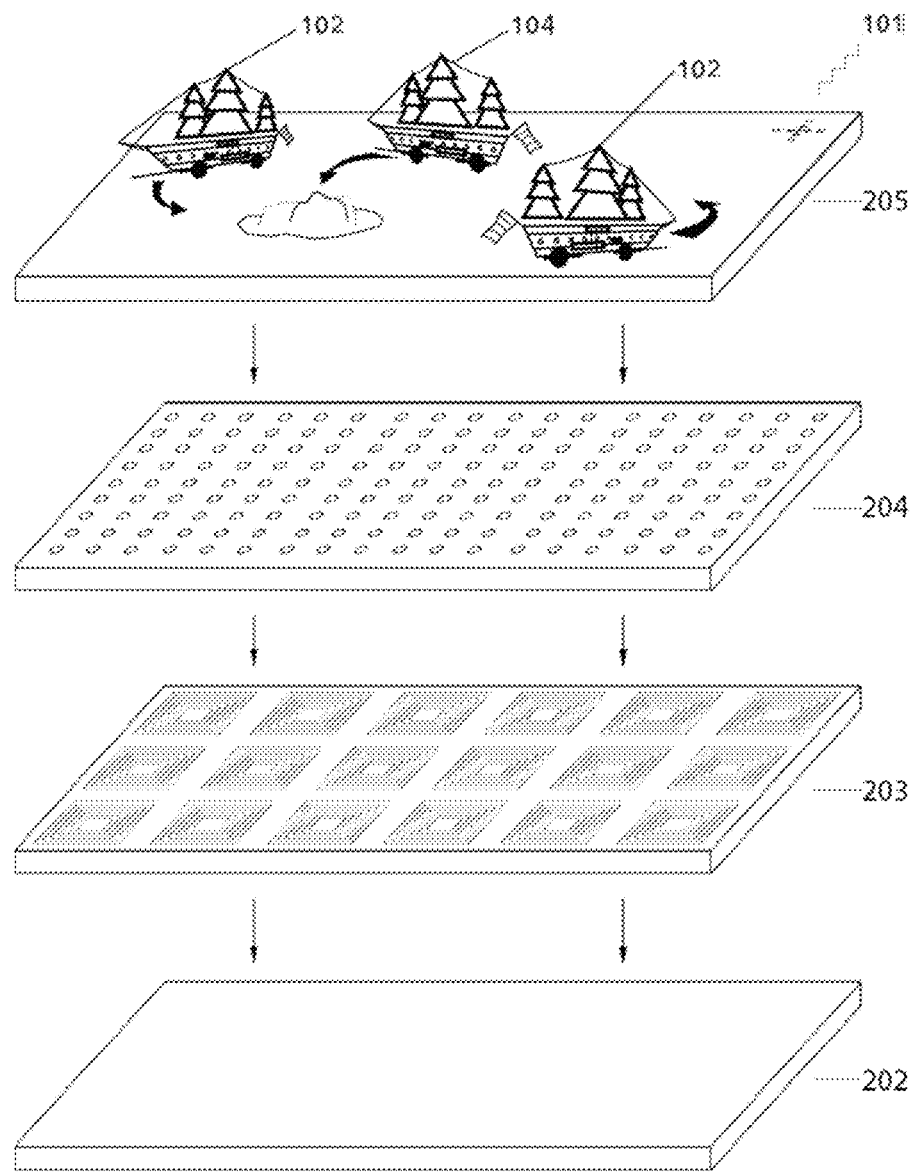
FIG. 2 is an exemplary schematic diagram of a cross-sectional view of the system for the interactive board game depicted in FIG. 1 segmented into layers for illustration purposes in accordance with one embodiment of the present invention.

As seen in FIG. 2, the interactive surface 101 comprises of four layers. The bottom layer 202 is the base of the board and is used as support. The second layer 203 is embedded with an RF antenna array and reader whose function is to wirelessly communicate with the electronic modules embedded within each individual vessel 102 or 104 in order to identify the UID and direct the vessels to move. The third layer 204 comprises of a densely packed capacitance sensor array and controller whose purpose is to accurately identify the position and orientation of each vessel 102 or 104 through capacitive coupling with the vessels' distinct pattern of capacitance tabs. Finally the top layer 205 is used as a both a protective sheet and the design of the naval arena.

The system further includes a second high-frequency RF antenna array that is not connected to a reader or any electrical path. An antenna in the second array is used to cover the blind spot of the first array in detecting an RFID tag on the object, for example, the vessel, by augmenting the electromagnetic field of the blind spot areas of the first array.

Each object placed on the interactive surface, for example, the vessel 102, can further include a microcomputer unit (MCU) that controls the movement module.

The processor directs the movement of the object by wireless communication modules that are embedded in the object and the interactive surface. The wireless communication module can be a 2.4 GHz module, a Bluetooth module, or a WIFI module.

Figure 3:
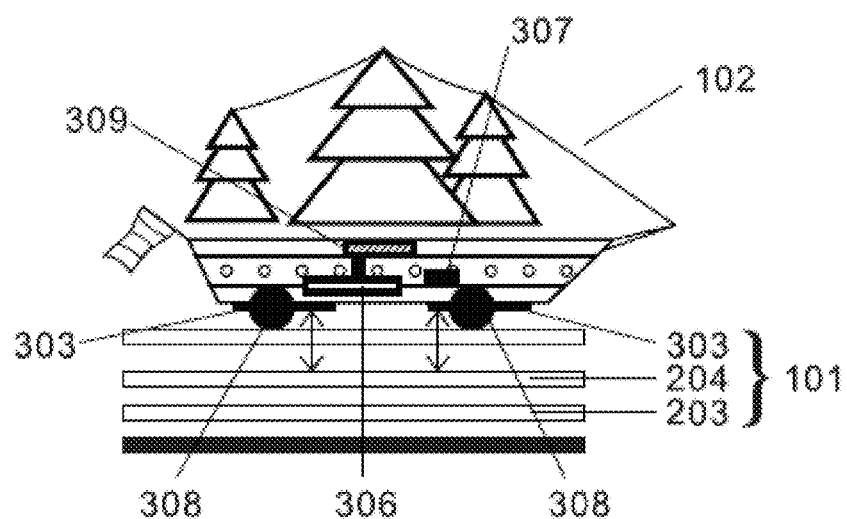
FIG. 3 is an exemplary schematic diagram that further illustrates a cross sectional view of the interactive surface and a vessel for the board game illustrated in FIG. 1 and FIG. 2 in accordance to one embodiment of the present invention.

FIG. 3 illustrates how a vessel's 102 UID and position is determined by the interactive surface (game board) 301 and how the processor directs the vessel 102 to move relative to the interactive surface 301.

As illustrated in FIG. 3, once a vessel 102 is placed upon the interactive surface 101, the distinct pattern of capacitance tabs 303 placed at the bottom of the vessel 102 couple with the capacitance sensors directed in the third layer 204 of the interactive board 101. Using the information as to which capacitance sensors have experienced a change in capacitance, the processor can, through inductive reasoning, determine the location of the vessel 102 placed upon the interactive surface 101. The processor then directs the RF antenna(s) of the second layer 203 located in closest proximity to the capacitance sensors that are experiencing a change in capacitance to wirelessly communicate with the vessel's 102 electronic module and obtain that vessel's 102 UID. Thus, the vessel's UID and position relative to the interactive surface is determined.

Figure 4:
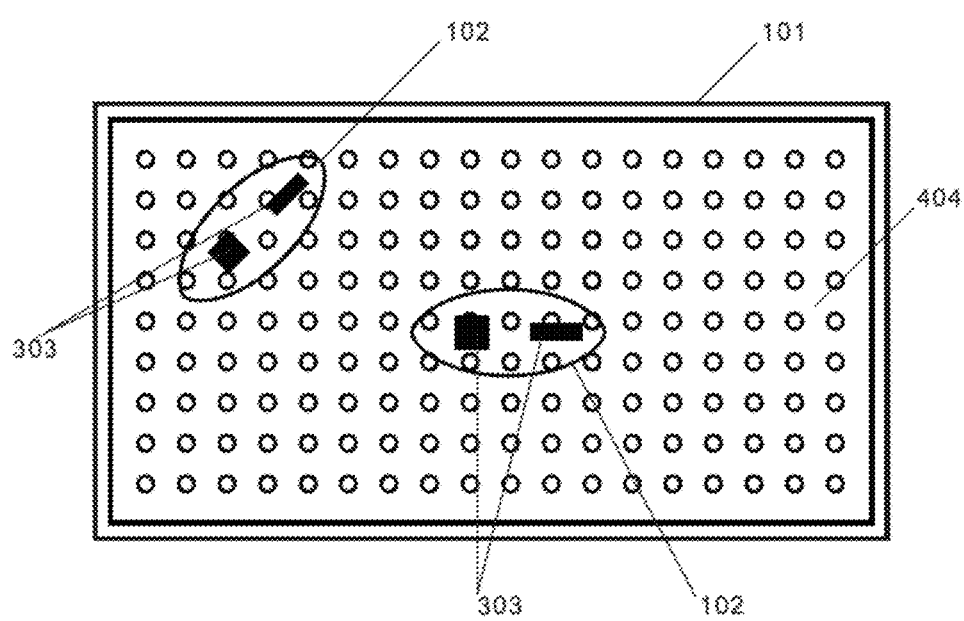
FIG. 4 is an exemplary schematic diagram that illustrates a bird's eye view of the interactive surface's conductive sensors and a vessel for the board game illustrated in FIGS. 1, 2 and 3 in accordance to one embodiment of the invention.

FIG. 4 further illustrates how a vessel's 102 orientation relative to the interactive surface 101 is determined. Embedded at the base of the vessel 102 are a distinct pattern of capacitance tabs 303. Once a vessel 102 is placed upon the interactive surface 101, these capacitance tabs couple with the capacitive sensors of the capacitive sensor array 404. From the pattern of capacitive sensors that have experienced a change in capacitance, the processor determines both the position and the orientation of the vessel relative to the interactive surface 101.

The abovementioned process by which a vessel's position, UID and orientation is determined by the processor is the same for a player's vessels and the A.I. opponent's vessels.

The abovementioned movement module includes a motor for forward and backward movement, a motor for making turns, and a power source. Once a player completes his actions on his turn, the processor directs the opponent's vessel 104 to move according to an electronic program. As previously stated these movements can be the result of A.I. programming or that of another player's commands. Referring back to the FIG. 3, one can see that each vessel 102 is embedded with a motor 306, steering device 307 and wheels 308 to allow for the accurate movement of the object relative to a surface in response to movement instructions received from the processor by the vessel's 302 electronic module 309.

The game board surface 101 can further include multiple vessels, and the paths of movement of the vessels are defined by the set of movement rules.

Given the dynamics of "Age of Sail" naval warfare, orientation of vessels relative to each other is a crucial strategic element since a vessel whose broadside is facing an incoming vessel is generally seen as at an advantage. The orientation of the vessel relative to the wind is also a crucial element of naval warfare tactics during the Age of Sail. Thus, the game embodiment described herein makes full use of the orientation and smooth steering of the vessels along arcs or curved paths. Referring back to FIG. 1, the bold arrows numbered 1 to 3 depict the curved path of each vessel 102, 104 upon a turn. In this scenario, the electronic program is configured to cause the vessels' 102, 104 speed (i.e., distance per turn) and curvature of turns (i.e., vessel turn arc) to be affected by wind blowing from west to east as well as the vessels' 102, 104 inherent steering attributes. As the opponent's vessel 104 is facing a headwind, the length and angle of its turn arc is shorter than if it had its back to the wind, thus, limiting its maneuverability in game.

Figure 5:
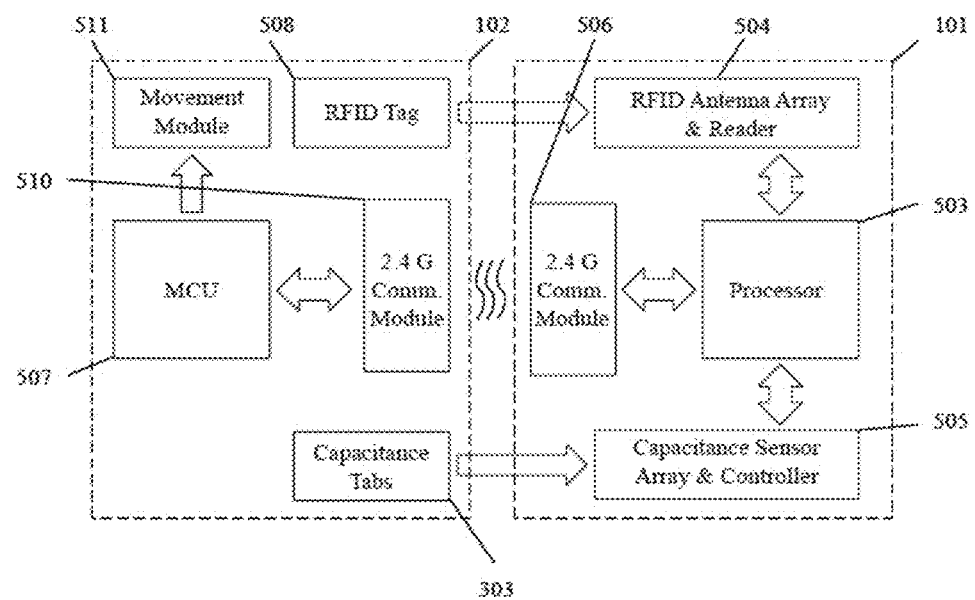
FIG. 5 is an exemplary schematic diagram that illustrates a process flow in accordance to one embodiment of the invention.

FIG. 5 is an exemplary schematic diagram that illustrates the process flow of the system, in the following steps:

Step 1: In the initialization stage, the processor 503 of the interactive surface 101 sends an instruction to the MCU 507 of the vessel 102, for the MCU 507 to record the host number and host address of the interactive surface 101 and the device number and device address of the vessel 102, creating a master-slave relationship for the vessel 102 to be controlled by the interactive surface 101.

Step 2: Once the vessel 102 is placed on the interactive surface 101, the capacitance sensor array and controller 505 detects the capacitance tabs 303 and sends the capacitive coupling information to the processor 503; the RF antenna array and reader 504 detects the UID of the RFID tag 508 and sends the UID information to the processor 503.

Step 3: The processor 503 calculates the location and orientation of the vessel 102 based on capacitive coupling information and the UID information received in step 2.

Step 4: The destination and the associated movement path are determined by game rules; the processor 503 sends an instruction to the MCU 507 through the 2.4 GHz communication module 506 to the 2.4 GHz communication module 510 wirelessly. The instruction sent by processor 503 includes the host number and host address of the interactive surface 101 and the device number and device address of the vessel 102, and commands for the motors and controllers within the movement module 511 to execute. The MCU 507 receives the instruction, confirms that the instruction is for the vessel 102, and sends the instruction to the movement module 511. The movement module 511 then starts the movement according to the instruction.

Step 5: The movement of the vessel 102 results in a change of capacitive coupling between the capacitance tab and the capacitance sensor array and controller; the capacitance sensor array and controller 505 sends the capacitive coupling information to the processor 503; the RF antenna array and reader 504 once again detects the UID of the RFID tag 508 to confirm the identity of the vessel 102 and sends the UID information to the processor 503.

Step 6: The processor receives the UID, location and orientation information in step 5, calculates the location and orientation of the vessel 102 and determines whether the vessel 102 has reached the intended destination. If the vessel 102 has not reached the intended destination, the processor 503 determines whether the vessel 102 has stayed on the correct path with the correct orientation. If the vessel 102 has not stayed on the correct path or had the correct orientation, the processor 503 issues a new instruction as outlined in step 4, and the steps 4, 5 and 6 are repeated, until the processor 503 determines that the vessel 102 has reached the intended destination through the associated movement path and with the correct orientation. In brief, the commends for movement, the commends for process correction and the notices of movement completion have been created continuously and throughout the movement.

Step 7: The game is over as the object reaches the intended destination, and the notice of completion is sent.

Figure 6:
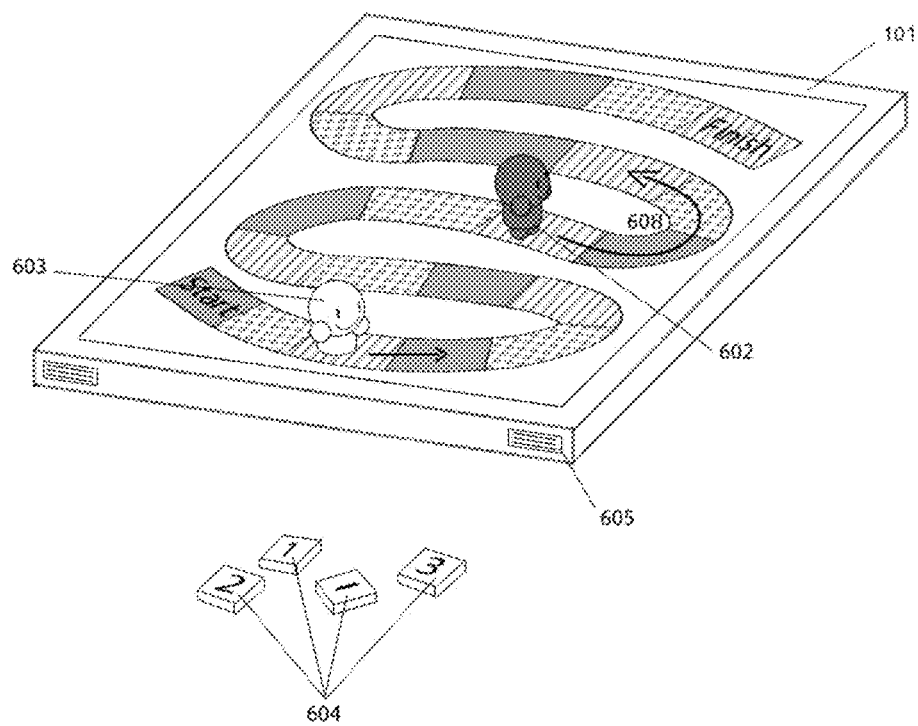
FIG. 6 is an exemplary schematic diagram that illustrates an interactive surface designed to play a variant of the game "Candy Land" in accordance to one embodiment of the invention.

FIG. 6 is an exemplary schematic diagram that illustrates the play of the game "Candy Land" in accordance to one embodiment of the invention. The interactive surface 101 is imprinted with the design of the game racing board game "Candy Land". The game requires no reading and minimal counting skills, making it suitable for young children. Due to the design of the game, there is no strategy involved—players are never required to make choices, just follow directions. The winner is predetermined by the shuffle of the cards. In this embodiment a player's figurine 603 is racing with an A.I. opponent's figurine 602. This is a turn-based game and the process is as follows.

A game starts once the player places his and the A.I. opponent's figurines 602, 603 on the "Start" square. The player then randomly picks up a number card 604 to see how many squares his figurine 603 can move up the path and proceeds to move his figurine by that number. Once the player has finished moving his figurine 603, the A.I. then proceeds to move its figurine 602 up the path by a random number. Thus, a turn-based race is performed until a figurine arrives at the "finish" destination and a winner is declared.

A speaker system 605 is affixed to the interactive surface 101 in order to provide audio feedback during gameplay.

The system and method as illustrated in FIG. 6 is similar to that described in the embodiment in FIG. 5. Thus, on an opponent's turn, the A.I. can direct the figurine 602 to move along the race path in such a manner that the figurine can move in a curved manner whenever it is moving along the race path bends. Referring back to FIG. 6, one can see the bold arrow numbered 608 illustrates the movement that the opponents 602 figurine will take along the curved path on its turn. In this scenario the figurine will move three squares forwards and realign itself as it proceeds along the path. As the figurine tackles this bend, the figurine will take a curved path and thus gradually rotate its orientation relative to the path so as to always face forwards along the path.

The invention claimed is:

1. A system comprising:
   an object embedded with a unique identification code (UID), a movement module, and a distinct pattern of capacitive tabs near a surface of the object;
   an interactive surface, wherein the object is placed on the interactive surface at any location and in any orientation, wherein the interactive surface is configured to recognize the UID, the location, and orientation information of the object placed on the interactive surface, wherein the interactive surface has, embedded beneath the interactive surface, a first array of high-frequency RF antennas for detecting the UID of the object, and a dense array of capacitance sensors for detecting the location and the orientation of the object;
   a processor operatively linked to the interactive surface, the processor being configured to direct, track and correct movement of the object along a defined path on the interactive surface by tracking the UID, the location and the orientation of the object continuously and throughout the movement; and
   a second high-frequency RF antenna array that is not connected to a reader or any electrical path, wherein each antenna of the second RF antenna array covers a blind spot of the first array of RF antennas.

2. The system of claim 1, wherein the object further comprises a microcomputer unit (MCU) that controls the movement module.

3. The system of claim 1, wherein the processor directs the movement of the object by wireless communication modules that are embedded in the object and the interactive surface.

4. The system of claim 3, wherein the wireless communication modules are selected from a group consisting of a 2.4 GHz module, a Bluetooth module, and a WIFI module.

5. The system of claim 1, wherein the movement module comprises a first motor for forward and backward movement, a second motor for making turns, and a power source.

6. The system of claim 1, wherein the processor formulates a movement instruction, a course correction instruction, and a movement completion notice based on the UID, the location and the orientation of the object, continuously and throughout the movement of the object.

7. The system of claim 1, further comprising a set of movement rules to define the path of movement of the object, wherein the set of movement rules is executed by a local server or a remote server.

8. The system of claim 7, further comprising a second object, wherein a path of movement of the second object is defined by the set of movement rules.

9. A method for directing the movement of an object on an interactive surface through a defined path, comprising:
   placing the object on the interactive surface, wherein the object is embedded with a unique identification code (UID), a movement module, and a distinct pattern of capacitive tabs near a surface of the object that makes contact with the interactive surface;
   recognizing the UID, a location and orientation information of the object at any location and in any orientation by the interactive surface;
   directing movement of the object by a processor that is operatively linked to the interactive surface;
   tracking the movement of the object by the processor through the UID, the location and the orientation information of the object; and
   correcting the movement of the object by the processor when the movement of the object deviates from the defined path, wherein the interactive surface has, embedded beneath the interactive surface, a first array of high-frequency RF antennas for detecting the UID of the object, and a dense array of capacitance sensors for detecting the location and the orientation of the object, wherein a second high-frequency RF antenna array is not connected to a reader or any electrical path, and wherein each antenna of the second RF antenna array covers a blind spot of the first array of RF antennas.

10. The method of claim 9, wherein the object further comprises a microcomputer unit (MCU) that controls the movement module.

11. The method of claim 9, further comprising directing, by the processor, the movement of the object by wireless communication modules that are embedded in the object and the interactive surface.

12. The method of claim 11, wherein the wireless communication modules are selected from a group consisting of a 2.4 GHz module, a Bluetooth module, and a WIFI module.

13. The method of claim 9, wherein the movement module comprises a first motor for forward and backward movement, a second motor for making turns, and a power source.

14. The method of claim 9, further comprising formulating, by the processor, a movement instruction, a course correction instruction, and a movement completion notice based on the UID, the location and the orientation of the object, continuously and throughout the movement of the object.

15. The method of claim 9, further comprising:
   defining, by a set of movement rules, the path of movement of the object; and
   executing, by a local server or a remote server, the set of movement rules.

16. The method of claim 15, further comprising:
   providing a second object; and
   defining, by the set of movement rules, a path of movement of the second object.

* * * * *